Jan. 19, 1943.  J. O. REED  2,308,715
PROCESS FOR REFINING TURPENTINE
Filed May 2, 1940
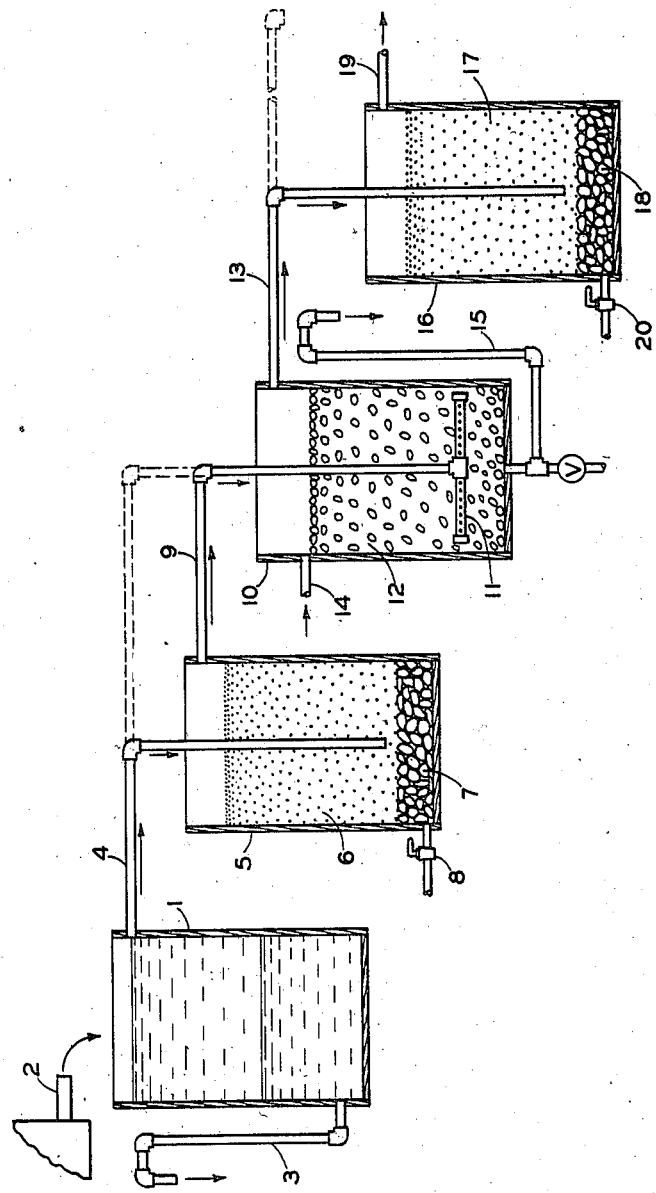
INVENTOR
Jesse O. Reed
BY
ATTORNEYS Patented Jan. 19, 1943

2,308,715

UNITED STATES PATENT OFFICE 2,308,715

PROCESS FOR REFINING TURPENTINE

Jesse O. Reed, Washington, D. C.; dedicated to the free use of the People in the territory of the United States Application May 2, 1940, Serial No. 332,919

1 Claim. (Cl. 260—666)

(Granted under the act of March 3, 1883, as amended April 30, 1928; 370 O. G. 757)

This application is made under the act of March 3, 1883, as amended by the act of April 30, 1928, and the invention herein described and claimed, if patented, may be manufactured and used by or for the Government of the United States of America for governmental purposes without the payment to me of any royalty thereon.

I hereby dedicate the invention herein described to the free use of the people in the territory of the United States to take effect on the granting of a patent to me.

Gum spirits of turpentine as it comes from the condenser of a turpentine still is mixed with a water condensate called "low wines" containing water-soluble acids. Due to the difference in the gravities of the acid-containing water and turpentine an immediate separation takes place in the barrel or separator used to receive the discharge from the said condenser. The turpentine which comes to the top of the separator barrel is drained off and the water is automatically discharged from the bottom. This separation is not complete, however, since some of the acidic water remains, not only entrained in the turpentine, but dissolved by the turpentine. The solubility of water in turpentine increases with an increase in temperature, so that the warmer the turpentine, when it is discharged from the condenser, the more water is carried in solution by the turpentine. The presence of both the entrained and the dissolved water in the turpentine has been shown by experiments to be one of the principal causes of turpentine deterioration and discoloration when placed in metal containers. Furthermore, when the turpentine is stored in glue lined wooden barrels, leakage often occurs because the water acts to soften the glue. In metal drums the acid-containing water attacks the metal or coating of the container causing contamination and discoloration of the turpentine with a corresponding loss of market value.

The general object of my invention is to provide a process and apparatus for conditioning turpentine so that deterioration of turpentine during storage will be reduced to a minimum.

Another object of my invention is to refine and purify turpentine so that it can be stored in cheap uncoated metal containers without discoloration.

A further object of my invention is to provide simple equipment for conditioning turpentine at the turpentine still which can be readily fabricated at small cost, and which is simple, automatic, and inexpensive in operation.

The accompanying drawing illustrates, diagrammatically, a convenient arrangement of an apparatus for carrying out my invention. The apparatus comprises a chamber 1, which receives the turpentine and "low wines" from the condenser outlet 2 of the turpentine still. The turpentine separates from the "low wine" in chamber 1 and comes to the top. The "low wine" or acid-containing water settles to the bottom and is discharged as waste through a pipe 3, connected at the bottom of chamber 1, while the turpentine discharges through a pipe 4, connected at the top. By correctly adjusting the height of pipe 3, a continuous separation and discharge of turpentine and "low wines" entering chamber 1 can be accomplished. The separated turpentine containing entrained and dissolved acidic water discharges into chamber 5 at a point near the bottom.

Chamber 5 is filled with salt 6 in coarse granular form over several inches of gravel 7. Turpentine enters the chamber 5 just above the top layer of the gravel 7, and is discharged through the pipe 9, tapped in at the top of the chamber. As the acidic water-contaminated turpentine from chamber 1 passes through the salt 6 in chamber 5, the entrained water and some of the dissolved water in the turpentine dissolves the salt and forms a brine which is considerably higher in specific gravity than turpentine and settles to the bottom of the chamber in the gravel 7. The brine accumulating in the gravel can be withdrawn from chamber 5 through a spigot 8.

Turpentine from chamber 5 flows through the pipe 9 into another chamber 10 and is introduced into chamber 10 in small streams through a perforated pipe 11 disposed near the bottom of the chamber, or by any other suitable means. Chamber 10 is filled with packing 12, such as fine washed gravel 12, to a level several inches below a discharge pipe 13. At the top level of packing 12, cool water is continuously introduced into chamber 10 through pipe 14, and discharged as waste through pipe 15, which is elevated similarly to the pipe 3 of chamber 1 to provide a continuous discharge of turpentine and water from chamber 10. As the turpentine from chamber 5 is introduced into chamber 10 in thin streams, it is brought into intimate contact with the water by means of the packing 12. Having a low specific gravity, the turpentine comes to the top of the water and in doing so becomes thoroughly washed and cooled to approximately the temperature of the water flowing continuously into chamber 10 through pipe 14. In this washing operation the water-soluble acids are removed from the entrained water-free turpentine from chamber 5, due to the fact that the wash water dilutes the acid solution and reduces the solubility of the acid thereof, and are carried away in the discharge water through pipe 15. In addition, the turpentine is cooled so that much of the acidic water dissolved by the turpentine is either carried away by the wash water through said pipe 15 or made ready for removal in a later stage of the process. Although the turpentine entering chamber 10 is perfectly clear and apparently free of impurities, I have discovered that it contains a gum-like material which is removed from the turpentine by the washing operation and settles between the turpentine and water layer in chamber 10. The composition of this gum-like material is not known, but its removal from the turpentine appears to be a factor contributing to the result that the turpentine can be stored for a long period without discoloration in uncoated metal containers.

The turpentine discharged from chamber 10 through pipe 13 contains some entrained and dissolved water which is removed from the said turpentine in chamber 16 with an apparatus similar to that of chamber 5. The washed turpentine enters chamber 16 near the bottom. Chamber 16 is filled with salt 17 in coarse granular form over gravel 18 several inches in height. Turpentine enters said chamber 16 just above the top layer of gravel 18 and discharges through pipe 19. As the turpentine, containing water from chamber 10, passes through said salt 17 in chamber 16, the water in said turpentine dissolves salt 17 and forms a brine which, having a higher specific gravity than turpentine, settles to the bottom of chamber 16 in gravel 18. When desired, the brine accumulated in gravel 18 can be withdrawn from chamber 16 through spigot 20. The conditioned turpentine, comprising the finished product of my invention, is discharged through pipe 19 into suitable containers for marketing or storing.

The washing operation in chamber 10 is also a cooling operation which discharges the turpentine at a constant temperature irrespective of the temperature of the turpentine at the condenser outlet 2 and chamber 1. The intimate contact of the cooling water with the turpentine during the washing operation, heretofore described, provides a very efficient method of cooling and obtaining a fairly constant temperature of the turpentine at the discharge of the apparatus. More efficient results are obtained in the drying of the cooled turpentine in chamber 16, because of the decreased amount of water held in solution in the turpentine as compared to the turpentine handled in chamber 5. Turpentine discharged from the apparatus at a fairly uniform and constant temperature is of considerable value in packaging because more uniform volumes and weights are made possible than with turpentine of varying temperatures due to the fairly large coefficient of expansion which turpentine possesses.

In operation the flow of turpentine through the apparatus is continuous and it is effected by gravity, the rate of flow depending upon the rate of discharge from condenser outlet 2. The amount of washing water used is adjusted so that the turpentine is cooled to a temperature within several degrees of the temperature of the wash water entering chamber 5. The acidity of the wash water being discharged can also be used in determining the desired rate of flow of the wash water.

It is obvious that various modifications of the above apparatus and method may be resorted to without departing from the spirit and scope of my invention. For example, chamber 5 may be eliminated and the turpentine run directly from chamber 1 to chamber 10 by the expedient of introducing sufficient wash water into chamber 10 to compensate for results which would have been obtained by the use of chamber 5. The use of chamber 5, however, results in a more efficient operation and a more economical use of wash water. Also, if the wash water in chamber 10 is cool enough, the turpentine withdrawn therefrom is in a high state of refinement, and for many purposes the chamber 16 may be omitted. However, this does not preclude the use of salt chambers, in addition to the two illustrated, at any point in the process, or additional washing chambers.

Having thus described my invention, I claim:

The method of refining turpentine condensate comprising separating out by gravity entrained low wines, recovering the remainder of the product containing turpentine and dissolved and entrained acidic water, introducing the recovered product at the bottom of a column of salt, whereby the acidic water dissolves the salt of said column forming a brine, permitting said brine to separate by gravity, washing and cooling the remaining product by spraying it in a stream of cool water, collecting the supernatant liquid and introducing it at the bottom of another column of salt whereby the water dissolves the salt of said column to form a brine, permitting said brine to separate by gravity, and recovering the supernatant liquid as the refined product.

JESSE O. REED.